U.S. Patent No.: US 11,999,347 B2
Date of Patent: Jun. 4, 2024

(12) United States Patent
Magolan et al.

(54) NIGHTTIME DRIVING VEHICLE SPEED LIMITING

(71) Applicant: FORD GLOBAL TECHNOLOGIES, LLC, Dearborn, MI (US)

(72) Inventors: Allen Magolan, Brighton, MI (US); Steve Skikun, Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 883 days.

(21) Appl. No.: 16/534,153

(22) Filed: Aug. 7, 2019

(65) Prior Publication Data
US 2021/0039644 A1 Feb. 11, 2021

(51) Int. Cl.
B60W 30/00 (2006.01)
B60Q 5/00 (2006.01)
(Continued)

(52) U.S. Cl.
CPC ........ B60W 30/18009 (2013.01); B60Q 5/00 (2013.01); B60Q 9/00 (2013.01); B60W 10/18 (2013.01); B60W 10/20 (2013.01); B60W 50/082 (2013.01); B60W 2050/0075 (2013.01); B60W 2540/215 (2020.02); B60W 2552/40 (2020.02); B60W 2555/20 (2020.02); B60W 2556/50 (2020.02); B60W 2556/55 (2020.02); B60W 2710/18 (2013.01);
(Continued)

(58) Field of Classification Search
CPC ........... B60W 30/18009; B60W 10/20; B60W 50/082; B60W 2540/215; B60W 2552/40; B60W 2552/20; B60W 2556/55; B60W 2556/60; B60W 2050/0078; B60W 2050/0079; B60W 2710/18; B60W 2710/20; B60W 2720/10; B60Q 5/00; B60Q 9/00; B60Y 2200/116; H04W 4/021

See application file for complete search history.

(56) References Cited

U.S. PATENT DOCUMENTS 6,643,578 B2 * 11/2003 Levine ............... G06F 7/00 701/70
7,979,172 B2 7/2011 Breed
(Continued)

FOREIGN PATENT DOCUMENTS

| CN | 104553796 A | * 4/2015 | ............. B60K 31/00 |
| CN | 207291678 U | * 5/2018 | ............. B60K 31/00 |
| FR | 2228259 A1 | 11/1974 | |

OTHER PUBLICATIONS

Bassem, Mohamed & Bonny, Talal. IoV Road Safety: Vehicle Speed Limiting System. Mar. 2019 (Year: 2019).*
(Continued)

Primary Examiner — Elaine Gort
Assistant Examiner — Brittany Renee Peko
(74) Attorney, Agent, or Firm — Frank L. Lollo; MacMillan, Sobanski & Todd, LLC

(57) ABSTRACT

A method of operating a vehicle may include determining if a vehicle speed is controlled by a driver, and if the vehicle speed is controlled by the driver, determining if the vehicle is operating during night conditions. If the vehicle is operating during night conditions, activating a night drive mode that limits a maximum speed of the vehicle without regard to road speed limits.

16 Claims, 2 Drawing Sheets

(51) Int. Cl.
*B60Q 9/00*       (2006.01)
*B60W 10/18*      (2012.01)
*B60W 10/20*      (2006.01)
*B60W 30/18*      (2012.01)
*B60W 50/08*      (2020.01)
B60W 50/00        (2006.01)
H04W 4/021        (2018.01)

(52) U.S. Cl.
CPC ..... *B60W 2710/20* (2013.01); *B60W 2720/10* (2013.01); *B60Y 2200/116* (2013.01); *H04W 4/021* (2013.01)

(56) References Cited

U.S. PATENT DOCUMENTS

| | | | |
|---|---|---|---|
| 8,248,223 B2 | 8/2012 | Periwal | |
| 9,517,771 B2 | 12/2016 | Attard et al. | |
| 10,410,516 B1* | 9/2019 | Andersson | B60W 10/18 340/902 |
| 2009/0259395 A1* | 10/2009 | Sobue | G01C 21/26 701/208 |
| 2018/0222477 A1 | 8/2018 | Wang et al. | |
| 2020/0035000 A1* | 1/2020 | Raut | G08G 1/096708 345/443 |

OTHER PUBLICATIONS http://www2.tku.edu.tw/tkjse/13-4/05-EE9713.pdf, Lu, S-N, et al., Intelligent Safety Warning and Alert System for Car Driving, 2010.

\* cited by examiner

NIGHTTIME DRIVING VEHICLE SPEED LIMITING

BACKGROUND OF THE INVENTION

The present invention relates to limiting the speed of a vehicle driven by a human under certain circumstances and more particularly speed limiting during nighttime driving or other adverse driving conditions.

When first responders, such as police officers and ambulance drivers, respond to an emergency, they frequently travel at high rates of speed due to the urgency of the situation. These types of emergency situations may arise day or night, good weather conditions or bad. While these first responders are generally trained in driving techniques for high speed vehicle operation, there is still less time to react to situations on roadways when traveling at high speeds. This is particularly true at night and under inclement weather conditions, where the objects ahead of the vehicle may not be noticed until much later due to reduced visibility; and additionally stopping distance of the vehicle may be longer due to wet road conditions.

SUMMARY OF THE INVENTION

An embodiment contemplates a method of operating a vehicle comprising: determining if a vehicle speed is controlled by a driver; if the vehicle speed is controlled by the driver, determining if the vehicle is operating during night conditions; and if the vehicle is operating during night conditions, activating a night drive mode that limits a maximum speed of the vehicle without regard to road speed limits.

An embodiment contemplates a method of operating a vehicle comprising: (a) determining if a vehicle speed is controlled by a driver; (b) if the vehicle speed is controlled by the driver, determining if the vehicle is operating during night conditions by determining if a light sensor is detecting ambient light below a predetermined level, and if so employing a global positioning system and a telematics system to confirm that the vehicle is operating during night conditions; (c) if the light sensor detects night conditions but the global positioning system and the telematics system do not confirm that the vehicle is operating during night conditions, determining if the vehicle is operating during inclement weather; (d) if the vehicle is determined to be operating during inclement weather in step (c), activating a night drive mode that limits the maximum speed of the vehicle without regard to road speed limits; and (e) if the light sensor detects night conditions and the global positioning system and the telematics system confirm that the vehicle is operating during night conditions, activating the night drive mode.

An advantage of an embodiment is that a maximum vehicle speed may be set for a vehicle while a driver is driving under adverse conditions. Such conditions may include for example, nighttime driving, inclement weather driving, and driving near areas where extra safety is warranted. In addition, for a driver, such as a first responder, who needs a maximum vehicle speed above the particular set maximum, an override may allow for the higher vehicle speed. Additionally, beyond a maximum vehicle speed being set under such adverse conditions, steering control, braking assist and driving dynamics may also be adjusted to account for the adverse conditions under which the driver is driving the vehicle.

DETAILED DESCRIPTION

Figure 1:
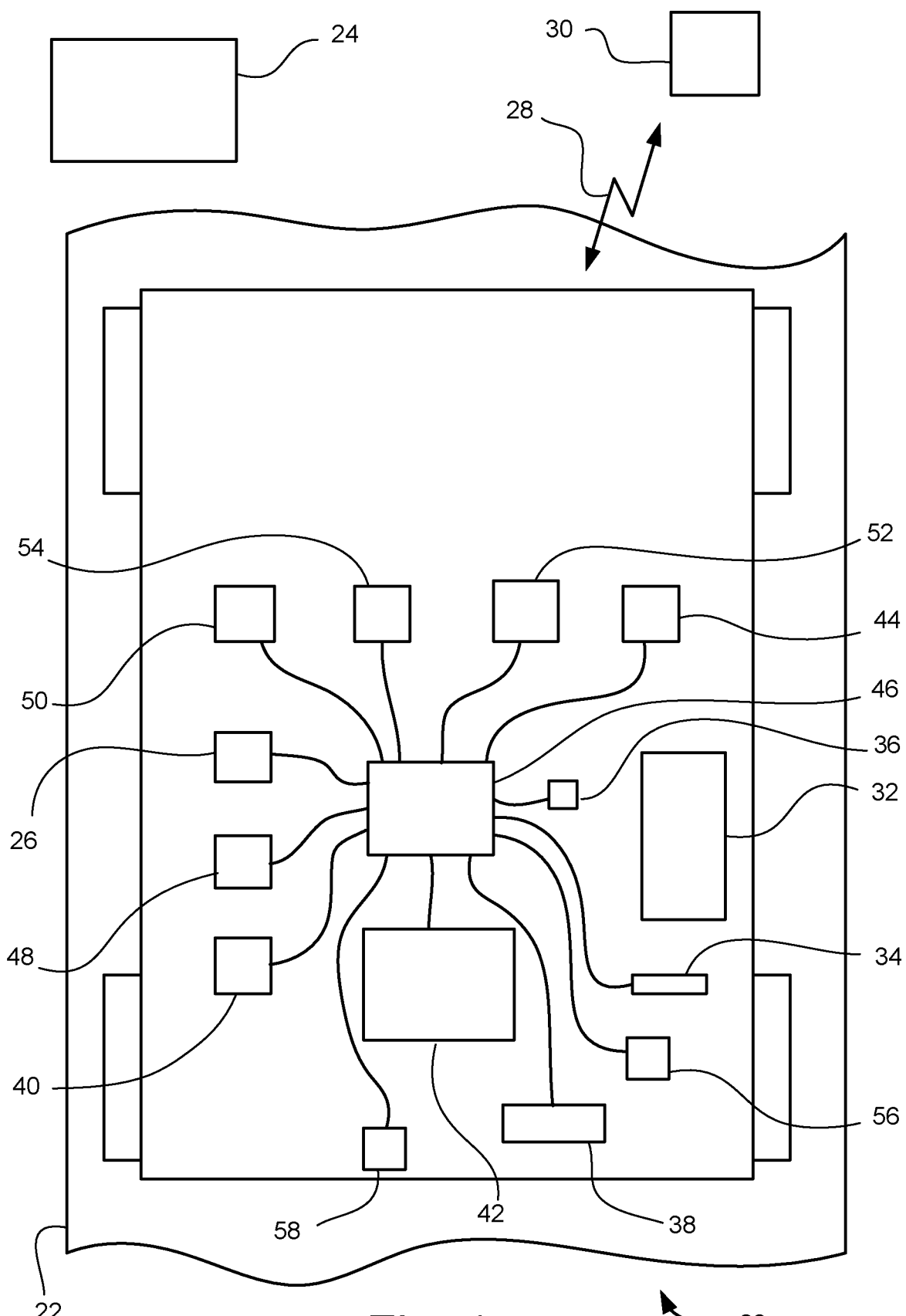
FIG. 1 is a schematic view of a vehicle and remote objects that may be pertinent to the driving of the vehicle.

FIG. 1 illustrates a vehicle 20 on a road 22, which may be in the vicinity of an area around a high pedestrian traffic area 24, such as a hospital, school or park. The vehicle 20 may have a telematics system 26 that is able to communicate wirelessly 28 with remote locations 30 and obtain information therefrom. The remote locations 30 may include a police dispatch station and communication with the internet.

The vehicle 20 is one that is operated by a driver 32. The driver 32 may be a first responder, such as a police officer, paramedic or other such emergency response person. As the vehicle 20 is operated by the driver 32, the speed at which the vehicle 20 travels is generally determined by the driver 32. So, while the vehicle 20 may have cruise control or other types of autonomous vehicle control functions, the night drive mode discussed herein relates to the periods when the driver is manually controlling the speed of the vehicle 20.

The vehicle 20 may include typical vehicle systems such as an instrument cluster 34, a vehicle ignition system 36 that includes a way to start the vehicle 20 such as for example a key, a key fob, or a wireless cellular device, windshield wipers 38, a braking system 40, a propulsion system 42, and a steering system 44. The vehicle 20 may also include systems such as a road friction estimation system 50, a drive dynamics system 52, interior and exterior temperature sensing system 54, and an ambient light sensing system 56. The vehicle systems and components may communicate with and be controlled through one or more central processing units 46.

In addition to the telematics system 26, the vehicle 20 may include other specialized systems such as a global positioning system (GPS) 48, and an obstacle detection system 58, such as a radar or Lidar system. The vehicle systems mentioned above are generally known to those skilled in the art and so will not be discussed further herein.

Figure 2:
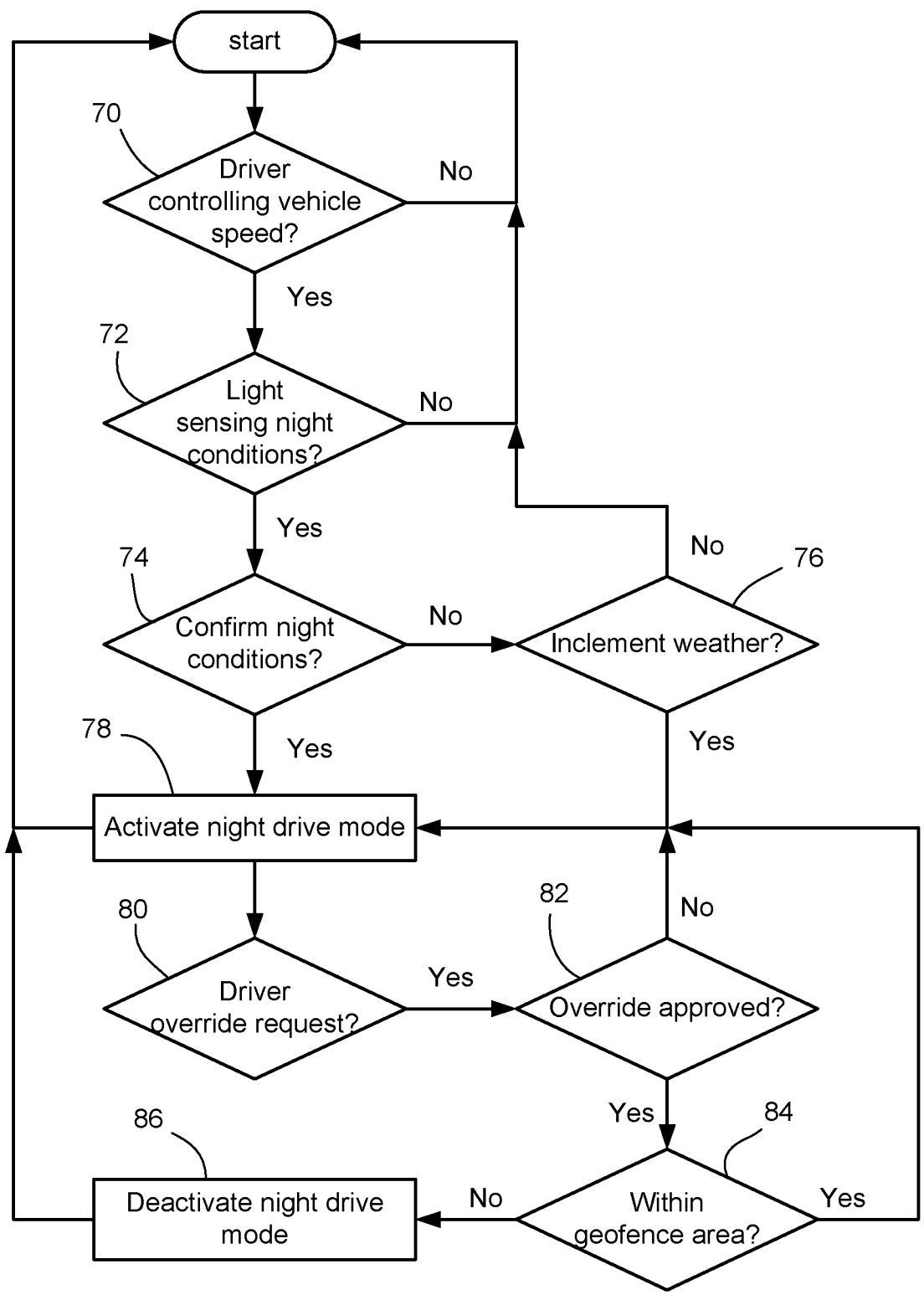
FIG. 2 is a flow chart illustrating a method of operating a vehicle.

FIG. 2 illustrates a flow chart relating to a method for operating the vehicle 20 of FIG. 1. While the vehicle 20 is being operated, the routine proceeds to determine whether the driver 32 is manually controlling the vehicle speed, step 70. If not, then the routine continues monitoring.

If so, then the ambient light sensing system determines if the vehicle operation is occurring during night conditions, step 72. This may take the form of the central processing unit(s) 46 determining if an ambient light sensor is sensing a light level below a predetermined light threshold. If not, then the routine continues monitoring. If so, then the GPS 48 and telematics 26 systems confirm that the vehicle 20 is operating during night conditions, step 74. This may take the form of the GPS 48 and telematics 26 systems detecting the vehicle location and communicating with the remote location 30, such as the internet, to confirm that that time of day is between sunset and sunrise for that location and time of year. This confirmation step helps to eliminate false detection of night driving.

If not confirmed as night conditions, then a determination may be made as to whether the vehicle 20 is operating in inclement weather, step 76. This may take the form of inferring inclement weather conditions when, for example, the windshield wipers 38 are on, the ambient temperature is below a predetermined threshold or the estimation of road friction is low. Also, this may take the form of employing the GPS 48 and telematics 26 systems to obtain the weather conditions. If no inclement weather conditions, then the routine continues monitoring. If so, then the central processing unit(s) 46 change the operation of the vehicle 20 into night drive mode, step 78.

The term night drive mode, as used herein, limits the maximum speed allowed for the vehicle 20, with this maximum speed of night drive mode being without regard to the various speed limits on the various roads 22 that the vehicle 20 is traveling on. Thus, the driver 32 cannot exceed this speed no matter how far the driver depresses an accelerator pedal. This may be independent from which human driver is currently operating the vehicle. Accordingly, autonomous vehicle operation where a processor is tracking and operating the vehicle at the speed limits for the particular roads is not night drive mode.

Additionally, when the vehicle 20 is in night drive mode, an indicator may be activated on the instrument cluster 34 to alert the driver 32 that night drive mode is active. Night drive mode may also change the operation for the steering system 44, boost assist for the braking system 40 and the vehicle dynamics for the drive dynamics system 52 to more conservative settings to account for the reduced visibility of driving at night.

If the night driving is confirmed in step 74, then the central processing unit(s) 46 change the operation of the vehicle 20 into the night drive mode, step 78, with the vehicle operating changes just discussed above.

When operating in night drive mode, step 78, the driver 32 may request an override of the speed and other limitations of the vehicle 20 set when in this mode, step 80. If not, then the vehicle continues operating in night drive mode while monitoring for changed vehicle conditions. If so, then a request may be sent through the GPS 48 and telematics 26 systems to request an override of the night drive mode. This override request may be sent, for example, to a remote location 30 such as a police dispatch office if the driver 32 is a law enforcement officer. The request may be indicated, for example, by the driver 32 activating emergency lights and siren on the vehicle 20 and then depressing a button on the instrument cluster 34 or a steering wheel of the steering system 44.

A determination may then be made as to whether the override was approved, step 82. This override approval may come for example from the remote location 30. If not approved, then the vehicle 20 remains in night drive mode. If override is approved, then a determination may be made as to whether the vehicle 20 is within a geofence area, step 84. A geofence area may be, for example, an area 24 around locations with high pedestrian traffic, such as schools, hospitals, parks, etc. Whether the current location of the vehicle 20 is within a geofence area may be determined, for example, by obtaining data via the GPS 48 and telematics 26 systems.

If the vehicle 20 is within a geofence area, then the vehicle 20 may continue operating in night drive mode while monitoring for changed vehicle conditions. If not, then the central processing unit(s) 46 may deactivate the night drive mode, step 86. With the night drive mode deactivated, the driver 32 may again operate the vehicle at the higher speeds above the night drive mode vehicle speed limit.

While certain embodiments of the present invention have been described in detail, those familiar with the art to which this invention relates will recognize various alternative designs and embodiments for practicing the invention as defined by the following claims.

The invention claimed is:

1. A method of operating a vehicle comprising:
   (a) determining if a vehicle speed is controlled by a driver;
   (b) if the vehicle speed is controlled by the driver, determining if the vehicle is operating during night conditions, which includes determining if a light sensor is detecting ambient light below a predetermined level, and if the ambient light is below the predetermined level, then employing a global positioning system and a telematics system to confirm that the vehicle is operating during night conditions; and
   (c) if the vehicle is operating during night conditions, activating a night drive mode that limits a maximum speed of the vehicle without regard to road speed limits.

2. The method of claim 1 wherein step (b) further includes, if the global positioning system and the telematics system do not confirm that the vehicle is operating during night conditions, determining if the vehicle is operating during inclement weather; and step (c) includes, if operating during inclement weather, activating the night drive mode.

3. The method of claim 1 further comprising:
   (d) if the night drive mode is activated in step (c), determining if a driver override request is requested; and
   (e) if the driver override request is requested, determining if the driver override request is approved.

4. The method of claim 3 wherein if the driver override request is approved, deactivating the night drive mode.

5. The method of claim 3 wherein if the driver override request is approved,
   (f) determining if the vehicle is within a geofence area; and
   (g) if the vehicle is within a geofence area, continue operating the vehicle in the night drive mode.

6. The method of claim 5 wherein a geofence area is determined based on locations having high pedestrian traffic.

7. The method of claim 3 wherein determining if the driver override request is requested includes activating a vehicle siren and activating a button in the vehicle.

8. The method of claim 3 wherein if the driver override request is not approved, the vehicle continues operating in the night drive mode.

9. The method of claim 3 wherein the driver override request is requested by employing the global positioning system and the telematics system to wirelessly contact a remote location.

10. The method of claim 1 wherein step (c) includes the activation of the night drive mode also activating an indicator on an instrument cluster that the vehicle is in night drive mode.

11. The method of claim 1 wherein step (c) includes the activation of the night drive mode also altering the operation of a steering system.

12. The method of claim 1 wherein step (c) includes the activation of the night drive mode also increasing boost assist for a braking system.

13. The method of claim 1 wherein step (c) includes the activation of the night drive mode also altering operation of a drive dynamics system.

14. A method of operating a vehicle comprising:
   (a) determining if a vehicle speed is controlled by a driver;
   (b) if the vehicle speed is controlled by the driver, determining if the vehicle is operating during night conditions by determining if a light sensor is detecting ambient light below a predetermined level, and if so employing a global positioning system and a telematics system to confirm that the vehicle is operating during night conditions;
   (c) if the light sensor detects night conditions but the global positioning system and the telematics system do not confirm that the vehicle is operating during night conditions, determining if the vehicle is operating during inclement weather;

(d) if the vehicle is determined to be operating during inclement weather in step (c), activating a night drive mode that limits the maximum speed of the vehicle without regard to road speed limits; and (e) if the light sensor detects night conditions and the global positioning system and the telematics system confirm that the vehicle is operating during night conditions, activating the night drive mode.

15. The method of claim 14 wherein determining if the vehicle is operating during inclement weather includes detecting of windshield wipers are on.

16. The method of claim 14 wherein determining if the vehicle is operating during inclement weather includes estimating that road friction for the vehicle is below a predetermined threshold.

* * * * *